(12) United States Patent
Givoly (10) Patent No.: US 9,311,455 B1
(45) Date of Patent: Apr. 12, 2016

(54) SYSTEM, METHOD, AND COMPUTER PROGRAM FOR DISTRIBUTING PAYMENT TO DIGITAL CONTENT OWNERS

(75) Inventor: Tal Givoly, Cupertino, CA (US)

(73) Assignee: Amdocs Software Systems Limited, Dublin (IE)

( * ) Notice: Subject to any disclaimer, the term of this patent is extended or adjusted under 35 U.S.C. 154(b) by 1350 days.

(21) Appl. No.: 12/246,929

(22) Filed: Oct. 7, 2008

(51) Int. Cl.
*G06F 21/10* (2013.01)
*G06F 21/00* (2013.01)

(52) U.S. Cl.
CPC ............... *G06F 21/10* (2013.01); *G06F 21/00* (2013.01)

(58) Field of Classification Search
CPC ...................................................... G06F 21/10
See application file for complete search history.

(56) References Cited

U.S. PATENT DOCUMENTS

| | | | | |
|---|---|---|---|---|
| 5,557,658 | A * | 9/1996 | Gregorek et al. | 379/88.25 |
| 5,825,883 | A * | 10/1998 | Archibald et al. | 705/53 |
| 5,892,900 | A * | 4/1999 | Ginter et al. | 726/26 |
| 5,910,987 | A * | 6/1999 | Ginter et al. | 705/52 |
| 6,226,618 | B1 * | 5/2001 | Downs et al. | 705/51 |
| 7,020,285 | B1 | 3/2006 | Kirovski et al. | 380/238 |
| 2002/0040395 | A1 * | 4/2002 | Davis et al. | 709/224 |
| 2002/0082997 | A1 * | 6/2002 | Kobata et al. | 705/51 |
| 2003/0005133 | A1 * | 1/2003 | Banerjee et al. | 709/229 |
| 2005/0125302 | A1 * | 6/2005 | Brown et al. | 705/26 |
| 2008/0201386 | A1 * | 8/2008 | Maharajh et al. | 707/201 |
| 2008/0212499 | A1 * | 9/2008 | Maes | 370/265 |
| 2008/0295128 | A1 * | 11/2008 | Aaltonen | 725/32 |
| 2010/0103820 | A1 * | 4/2010 | Fuller et al. | 370/236 |

FOREIGN PATENT DOCUMENTS

EP          1724699 A1 * 11/2006

OTHER PUBLICATIONS

IPDR/SP Protocol Specification, Mar. 2, 2007, IPDR, Inc., Version 2.3, all pages.*
Riggs, Programming Wireless Devices with the Java 2 Platform, Second Edition, 2003, Addison-Wesley, chapter 2.*
Gordon et al., The OpenCable Application Platform, Jan. 2008, IEEE Signal Processing Magazine, all pages.*
Current Book, "Dharward Guestbook," Jun. 17, 2002, retrieved from http://web.archive.org/web/20020617234417/http://www.dharwad.com/guestbook/jandec2001.html on Jul. 21, 2011.
2001: The First Year at MP3.com, May 16, 2006, retrieved from http://web.archive.org/web/20060516032915/http://www.grundman.org/documents/54.html on Jul. 21, 2011.
TM Fourum—IPDR, Jul. 23, 2008, retrieved from http://web.archive.org/web/20080723123730/http://www.ipdr.org/ on Jul. 21, 2011.

* cited by examiner

Primary Examiner — Jacob C. Coppola
(74) Attorney, Agent, or Firm — Zilka-Kotab, PC (57) ABSTRACT

A system, method, and computer program are provided for distributing payment to digital content owners. In use, usage of digital content is identified, utilizing a source of the usage of the digital content. Further, a record of the usage of the digital content is transmitted to a central collection system, for use in distributing payment to an owner of the digital content.

5 Claims, 6 Drawing Sheets

SYSTEM, METHOD, AND COMPUTER PROGRAM FOR DISTRIBUTING PAYMENT TO DIGITAL CONTENT OWNERS

FIELD OF THE INVENTION

The present invention relates to digital content usage, and more particularly to payment for digital content.

BACKGROUND

Traditionally, access to digital content has been provided in exchange for payment. For example, digital content owners have generally required compensation from end users in exchange for allowing the end users to access the digital content. However, traditional techniques for providing payment for access to digital content to the owners of the digital content have customarily exhibited various limitations.

There is thus a need for addressing these and/or other issues associated with the prior art.

SUMMARY

A system, method, and computer program are provided for distributing payment to digital content owners. In use, usage of digital content is identified, utilizing a source of the usage of the digital content. Further, a record of the usage of the digital content is transmitted to a central collection system, for use in distributing payment to an owner of the digital content.

DETAILED DESCRIPTION

Figure 1:
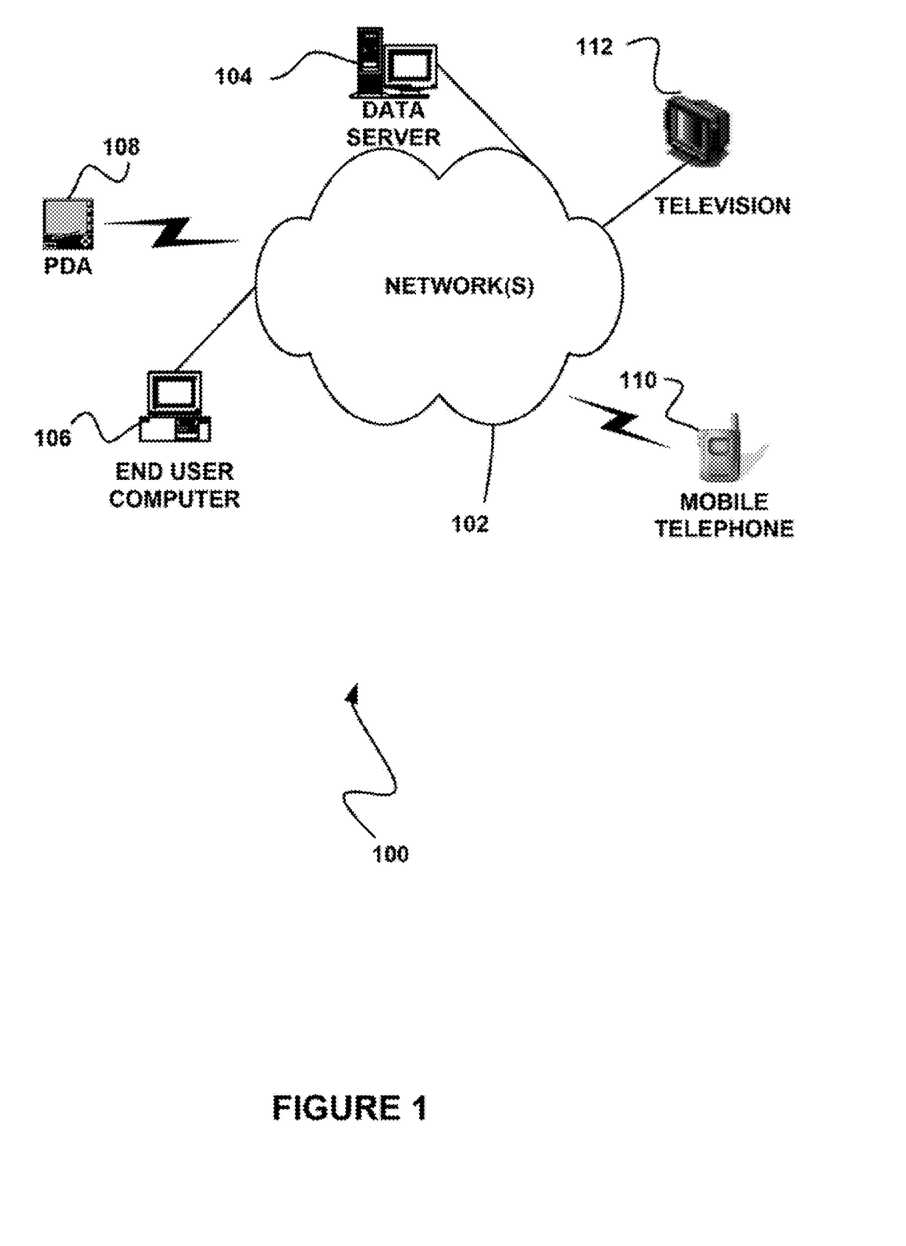
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
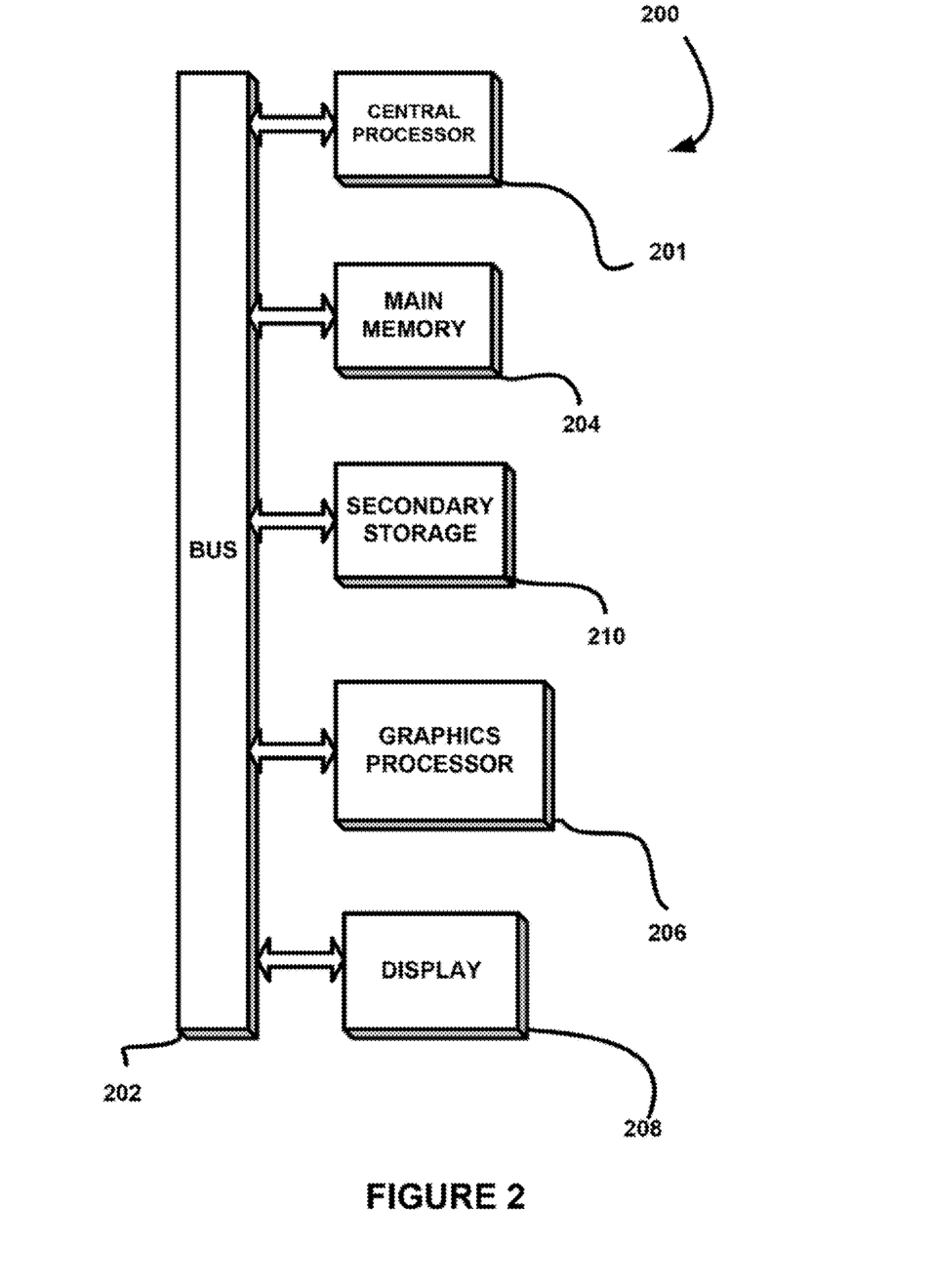
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
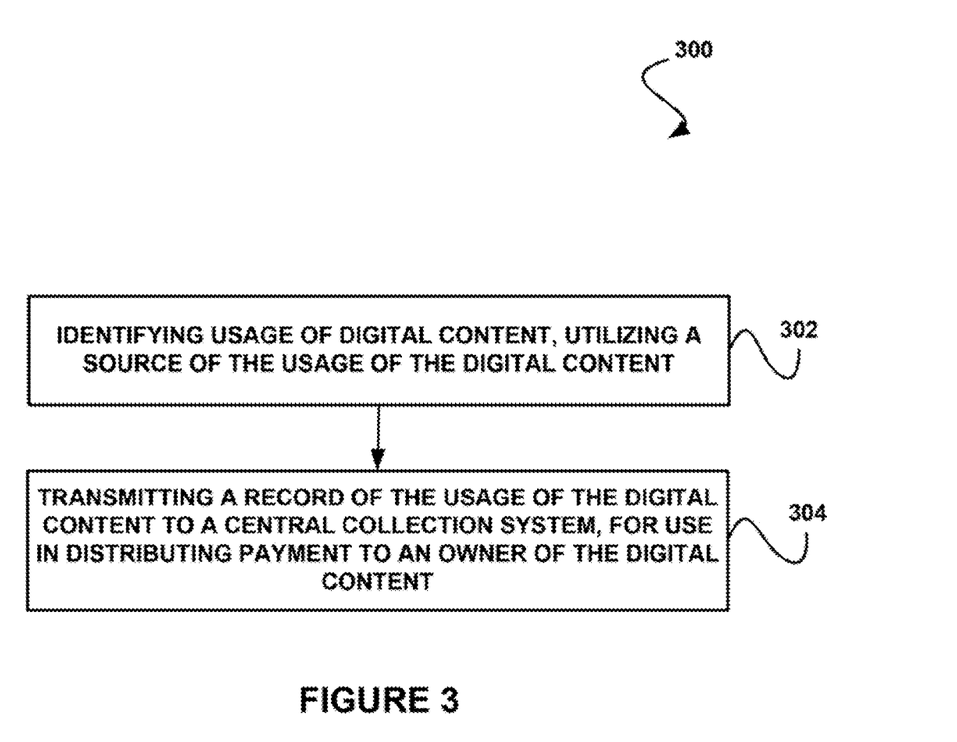
FIG. 3 illustrates a method for distributing payment to digital content owners, in accordance with one embodiment.

FIG. 3 illustrates a method 300 for distributing payment to digital content owners, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, usage of digital content is identified, utilizing a source of the usage of the digital content. With respect to the present description, the digital content may include any content of digital form that is capable of being used. For example, the digital content may include digital audio (e.g. music, etc.), digital video, digital text, digital images, etc. As an option, the digital content may include licensed digital content.

In one embodiment, the usage of the digital content may include playback of the digital content. Just by way of example, the digital content may be used by playing the digital content (e.g. to a user, etc.). The digital content may optionally be played utilizing a playback device (e.g. a digital media player application, etc.). Of course, it should be noted that the usage of the digital content may include any visual and/or audio presentation of the digital content.

Accordingly, the source of the usage of the digital content may include a device utilized to present the digital content (e.g. to a user, etc.). Such device may include any of the devices described above with respect to FIGS. 1 and/or 2, for example. As another option, the source of the usage of the digital content may include an application utilized to present the digital content. The device and/or application may include the digital media player application described above, for example.

In another embodiment, the usage of the digital content may be identified by monitoring the usage of the digital content. For example, the source of the usage of the digital content may be monitored for identifying the usage of the digital content. Thus, a device and/or application capable of being utilized to perform the digital content usage may be monitored.

As another option, the source of the usage of the digital content may be monitored for identifying initiation of the usage of the digital content. As yet another option, the source of the usage of the digital content may be monitored for identifying completion of the usage of the digital content. To this end, identifying the usage of the digital content may include identifying the initiation and/or completion of the usage of the digital content. It should be noted, however, that the usage of the digital content may be identified in any manner that utilizes the source of the usage of the digital content.

As also shown, a record of the usage of the digital content is transmitted to a central collection system, for use in distributing payment to an owner of the digital content. Note operation 304. With respect to the present description, the record of the usage of the digital content may include any information indicating the usage of the digital content.

In one embodiment, the record of the usage of the digital content may identify the digital content, such as a name of the digital content and/or any unique identifier of the digital content. In another embodiment, the record of the usage of the digital content may identify a time, date, etc. of the usage of the digital content. For example, the record of the usage of the digital content may identify a time of initiation and/or completion of the usage of the digital content. Of course, however, such record may include any data associated with the usage of the digital content.

Furthermore, the record of the usage of the digital content may be transmitted to the central collection system in any desired manner. As an option, the central collection system may be remotely located with respect to the source of the usage of the digital content. Thus, the record of the digital content may optionally be transmitted from the source of the usage of the digital content to the central collection system over a network (e.g. such as any of the networks described above with respect to FIG. 1).

In one embodiment, the record of the usage of the digital content may include an Internet protocol detail record (IPDR). In addition, the IPDR may be transmitted utilizing an IPDR streaming protocol (IPDR/SP). For example, the IPDR may include that described at www.ipdr.org, which is hereby incorporated by reference.

In another embodiment, the record of the usage of the digital content may be transmitted utilizing a Java® specification request (e.g. JSR-190) application programming interface (API). In yet another embodiment the record of the usage of the digital content may be transmitted utilizing an open cable application platform. As an option, the open cable application platform may include that described at www.opencable.com, which is hereby incorporated by reference.

Moreover, the central collection system to which the record of the usage of the digital content is transmitted may include any system capable of receiving the record of the usage of the digital content for use in distributing payment to an owner of the digital content. Just by way of example, the central collection system may include a server, a database, etc. As another example, the central collection system may be integrated with a digital content provider allowing (e.g. facilitating, etc.) the usage of the digital content. Thus, the digital content provider may optionally store the digital content for usage thereof.

Still yet, the owner of the digital content may include a licensor of the digital content. For example, the owner of the digital content may own an intellectual property right (e.g. copyright, etc.) with respect to the digital content. In one embodiment, the owner of the digital content may license the digital content to the digital content provider, To this end, a record of the usage of the digital content may be transmitted to the central collection system, such that the central collection system may distribute payment to the owner of the digital content for the usage of the digital content. As an option, transmitting the record of the usage of the digital content may allow precise accounting associated with digital content based on actual usage of such digital content. Further, such precise accounting may be utilized to distribute payment to the owner of digital content in proportion to the actual usage of the digital content.

In another optional embodiment, the record of the usage of the digital content may be transmitted to the central collection system, for use in distributing a report of the usage of the digital content to the owner of the digital content. Just by way of example, the report may be transmitted to the owner even if the payment is not transmitted to the owner. Of course, however, the report may also be transmitted to the owner with the transmission of the payment.

The report may include information regarding the usage of the digital content, as noted above, in addition to any other information desired. In one embodiment, the report may indicate the user of the digital content (e.g. the user to which the digital content is presented, etc.). In another embodiment, the report may maintain an anonymity of the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
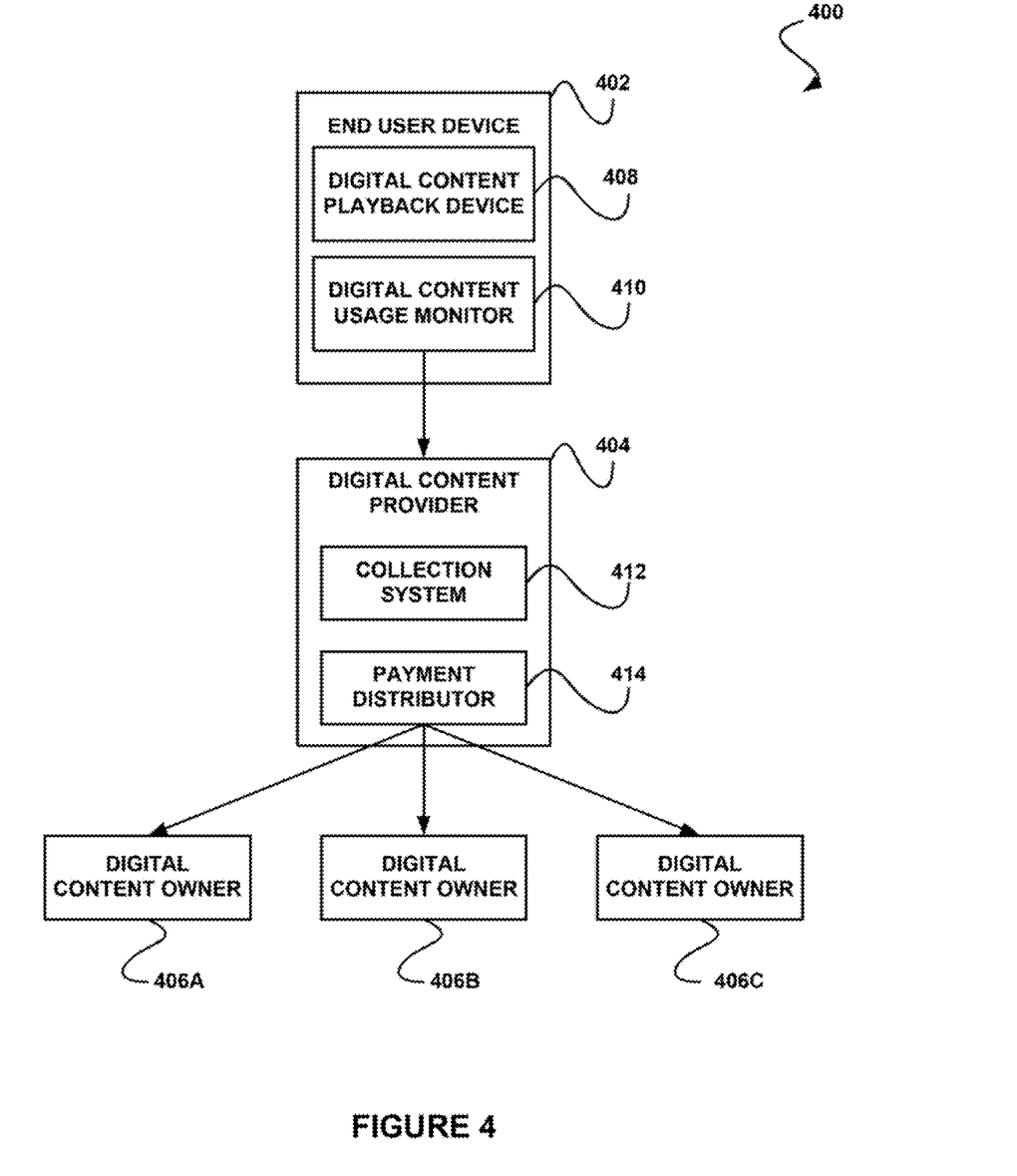
FIG. 4 illustrates a system for distributing payment to digital content owners, in accordance with another embodiment.

FIG. 4 illustrates a system 400 for distributing payment to digital content owners, in accordance with another embodiment. As an option, the system 400 may be implemented in the context of the details of FIGS. 1-3. Of course, however, the system 400 may be implemented in any desired environment. Further, the aforementioned definitions may equally apply to the description below.

As shown, an end user device 402 is in communication with a digital content provider 404. The end user device 402 may include any device capable of using digital content. For example, the end user device 402 may include a mobile device, a workstation and/or any of the other devices described above with respect to FIGS. 1 and/or 2.

In addition, the digital content provider 404 may include any device capable of providing access to, therefore usage of, digital content. In one embodiment, the digital content provider 404 may include a server. Thus, while only one end user device 402 is shown, it should be noted that a plurality of end user devices may also be in communication with the digital content provider 404 for using content provided by the digital content provider 404, in another embodiment.

As an option, the digital content provider 404 may store any number of different digital contents (e.g. digital song, digital video, etc.). For example, the digital content provider 404 may store digital content in a database (not shown). Further, the digital content may be owned by a plurality of different digital content owners 406A-C. The digital content owners 406A-C may optionally license the digital content to the digital content provider 404 (e.g. in exchange for payment from the digital content provider 404).

To this end, the end user device 402 may use digital content stored by the digital content provider 404. As an option, a user of the end user device 402 may subscribe to a digital content providing service of the digital content provider 404, such that the end user device 402 may use the digital content via (e.g. in accordance with) the subscription. For example, the user of the end user device 402 may pay a subscription As another option, the end user device 402 may use the digital content based on an advertisement sponsor of the digital content. Just by way of example, an advertiser may sponsor any of the digital content stored by the digital content provider 404, such that the digital content provider 404 may provide advertising for the advertiser via the digital content providing service in exchange for the advertiser providing payment for such digital content. In this way, the advertiser may sponsor usage of the digital content by the end user device 402. As another option, the end user device 402 may use the digital content in exchange for payment a fee particular to the digital content. Thus, the payment may be made for each usage of the digital content. Thus, a subscription fee, a fee particular to the digital content, an advertisement sponsored fee, etc. may be paid for the usage of the digital content.

In one embodiment, the end user device 402 may access (e.g. download, etc.) the digital content stored by the digital content provider 404. In another embodiment, the end user device 402 may use the digital content via a digital content playback device 408 installed on the end user device 402. The digital content playback device 408 may include any device (and/or application), such as a media player, capable of being utilized to present the digital content to a user via the end user device 402, for example.

As an option, digital rights management (DRM) associated with the digital content may control usage of the digital content. The digital content playback device 408 may optionally read the DRM associated with the digital content (e.g. embedded in the digital content, etc.), for example. In this way, the digital content playback device 408 may optionally control usage of the digital content based on the DRM.

In one embodiment, the DRM may only allow usage of the digital content if it is determined that the end user device 402 is at least periodically (e.g. based on predetermined time limits, etc.) connected to the digital content provider 404. For example, complete playback of the digital content may be prevented via the DRM if it is determined that the end user device 402 has not connected to the digital content provider 404 within a predetermined time period. As another example, a quality of the playback of the digital content may be reduced if it is determined that the end user device 402 has not connected to the digital content provider 404 within a predetermined time period.

Moreover, the end user device 402 also includes a digital content usage monitor 410 installed thereon, as shown. The digital content usage monitor 410 may include any application capable of monitoring usage of digital content by the end user device 402. For example, the digital content usage monitor 410 may monitor initiation and/or completion of execution of the digital content playback device 408 for identifying usage of digital content by the end user device 402.

In one embodiment, the digital content usage monitor 410 may be separate from the digital content playback device 408. In this way, the digital content usage monitor 410 may optionally monitor usage of digital content by any number of different digital content playback devices 408 associated with the end user device 402. Of course, in another embodiment, the digital content usage monitor 410 may be integrated in the digital content playback device 408, such that each digital content playback device 408 on the end user device 402 may include a separate digital content usage monitor 410.

In response to identification of usage of digital content by the digital content usage monitor 410, the digital content usage monitor 410 transmits a record of such usage to the digital content provider 404. In one embodiment, the record may be transmitted to the digital content provider 404 over a network. In another embodiment, the record may be transmitted utilizing any desired network protocol.

A collection system 412 of the digital content provider 404 receives the record of the usage of the digital content. The collection system 412 may optionally include a database for storing the record. As an option, the collection system 412 may also be capable of identifying an owner of the digital content 406A-C (e.g. utilizing information included in the record, etc.).

Furthermore, a payment distributor 414 of the digital content provider 404 distributes payment to the owner of the digital content 404A-C, based on the record. For example, the payment distributor 414 may distribute payment for the identified usage of the digital content to the owner of the digital content 406A-C. The payment may optionally be predetermined based on a contract between the digital content owner 406A-C and the digital content provider 404. For example, the contract may indicate whether the payment is to be made after each usage of the digital content, after a predetermined period of time (e.g. a month, etc.) during which the digital content is used, etc.

Thus, in one embodiment, the digital content provider 404 may distribute the payment after each usage of the digital content. In another embodiment, the digital content provider 404 may distribute the payment on a monthly basis for all content usage during the associated month. Accordingly, the digital content provider 404 may maintain accurate records of the usage of the digital content for distributing payment for such usage to the digital content owner 406A-C. To this end, a payment may be distributed by the digital content provider 404 to a digital content owner 406A-C based on actual usage of digital content owned by the 406A-C.

Figure 5:
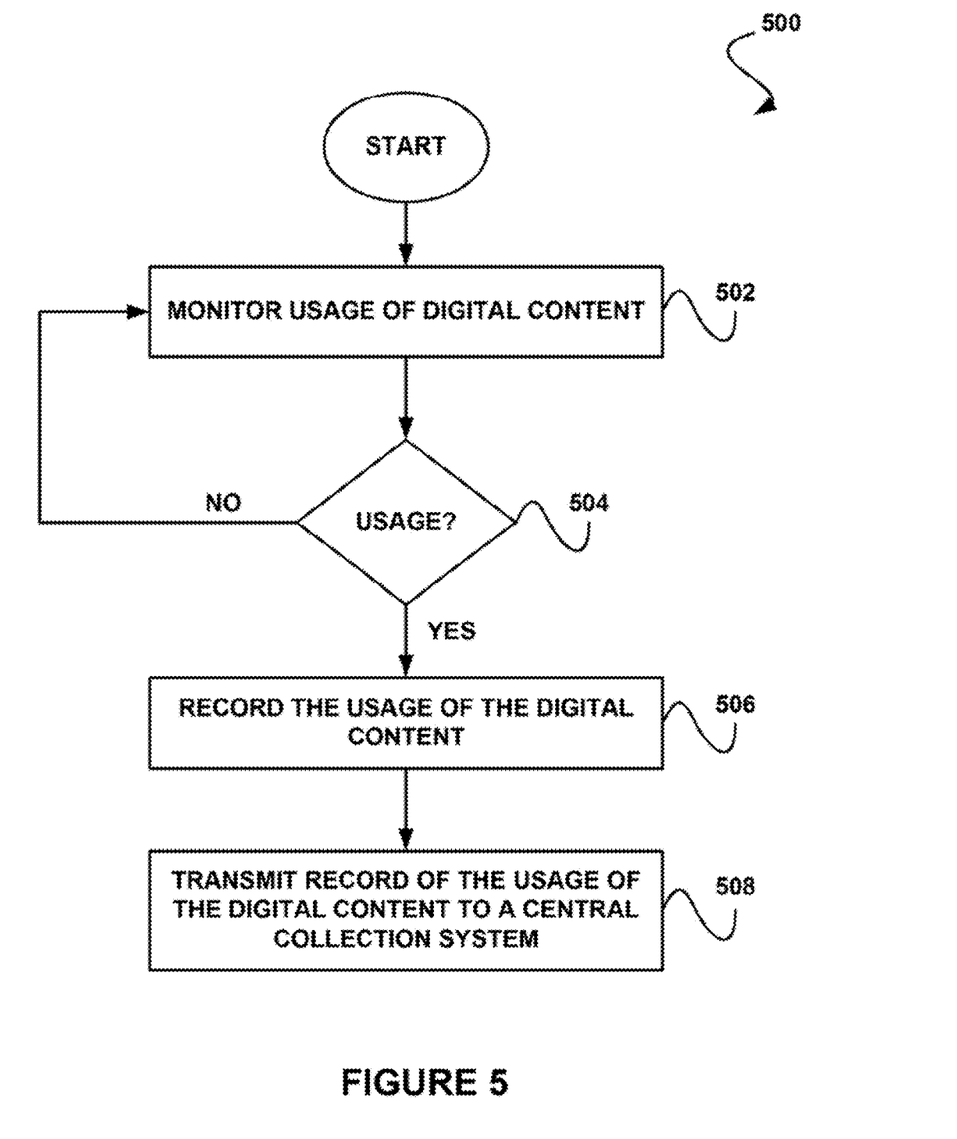
FIG. 5 illustrates a method for transmitting a record of digital content usage to a central collection system, in accordance with yet another embodiment.

FIG. 5 illustrates a method 500 for transmitting a record of digital content usage to a central collection system, in accordance with yet another embodiment. As an option, the method 500 may be carried out in the context of the details of FIGS. 1-4. For example, the method 500 may be carried out by the end user device 402 of FIG. 4. Of course, however, the method 500 may be carried out in any desired environment. Again, the aforementioned definitions may equally apply to the description below.

As shown in operation 502, usage of a digital content is monitored. In one embodiment, the usage of digital content may be monitored by monitoring initiation and/or completion of execution of a device utilized to perform the digital content usage (e.g. utilized to play back digital content). For example, the usage of the digital content may be monitored utilizing the digital content usage monitor 410 of FIG. 4.

In addition, it is determined whether usage of the digital content is identified, as shown in decision 504. As an option, the usage of the digital content may be identified based on the monitoring of the usage of the digital content. In one embodiment, usage of the digital content may be identified in response to a determination that execution of a device utilized for presenting the digital content (e.g. audibly and/or visually) has been initiated and/or completed.

If it is determined that usage of the digital content is not identified, the method 500 continues to monitor usage of the digital content (operation 502). If, however, it is determined that usage of the digital content is identified, the usage of the digital content is recorded. Note operation 506. With respect to the present embodiment, the usage of the digital content may be recorded in a record. Thus, the record may indicate the usage of the digital content.

Further, the record of the usage of the digital content is transmitted to a central collection system, as shown in operation 508. In one embodiment, the record may be transmitted over a network to the central collection system. In addition, the record may be transmitted utilizing any desired protocol (e.g. IPDR/SP, etc.).

Moreover, with respect to the present embodiment, the record may be transmitted for use in distributing payment to an owner of the digital content. Just by way of example, as described in more detail with respect to FIG. 6, the central collection system may distribute payment to the owner of the digital content in response to receipt of the record indicating usage of the digital content.

Figure 6:
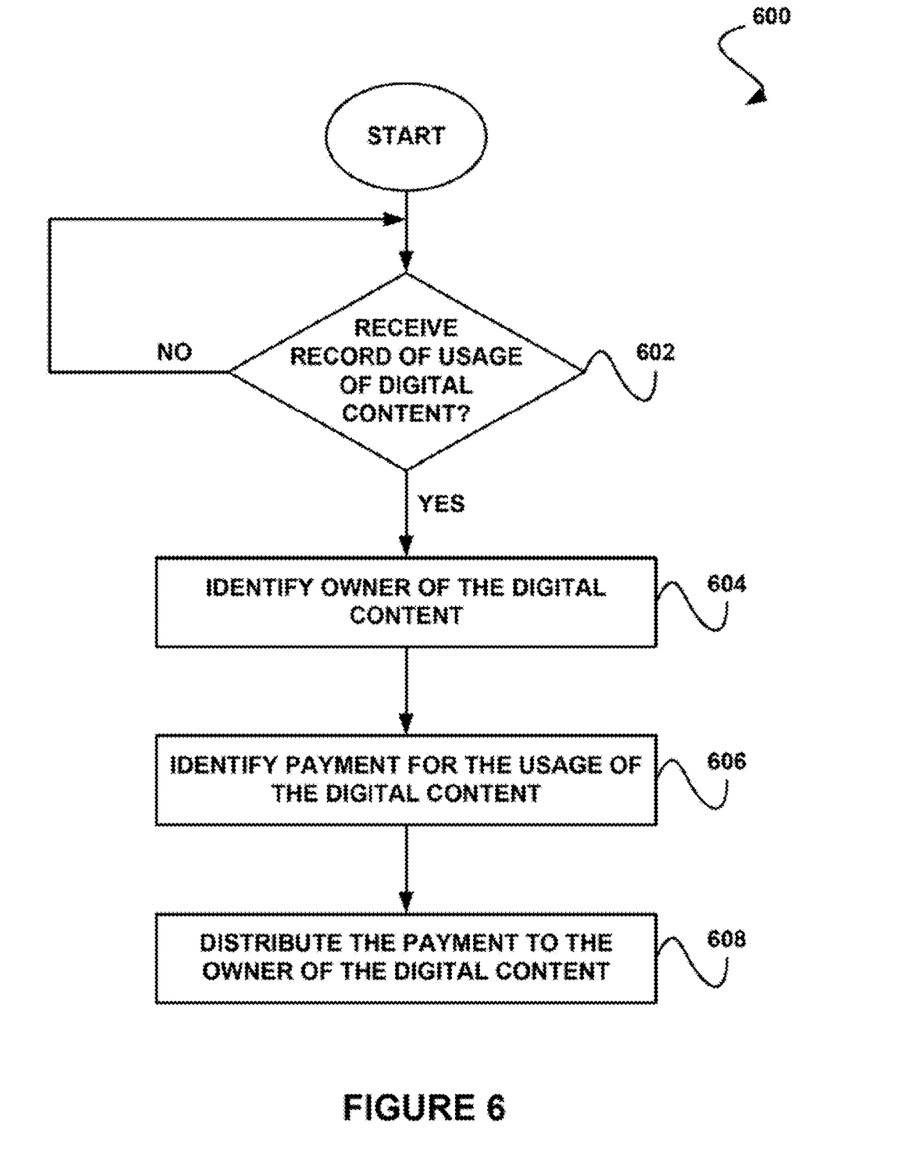
FIG. 6 illustrates a method for distributing payment to a digital content owner in response to receipt of a record of usage of digital content, in accordance with still yet another embodiment.

FIG. 6 illustrates a method 600 for distributing payment to a digital content owner in response to receipt of a record of usage of digital content, in accordance with still yet another embodiment. As an option, the method 600 may be carried out in the context of the details of FIGS. 1-5. For example, the method 600 may be carried out by the digital content provider 404 of FIG. 4. Of course, however, the method 600 may be carried out in any desired environment. Yet again, the aforementioned definitions may equally apply to the description below.

As shown in decision 602, it is determined whether a record of usage of digital content has been received. The record may indicate any usage of digital content (e.g. by an end user device, etc.), for example. Thus, the record may be received from any one of a plurality of sources of usage of digital content.

If it is determined that a record of usage of digital content has not been received, the method 600 continues to wait for such a record to be received. If, however, it is determined that a record of usage of digital content has been received, an owner of the digital content is identified. Note operation 604. The owner may include an owner of an intellectual property right to the digital content, for example.

In one embodiment, the owner of the digital content may be identified utilizing the record. As an option, the record may indicate the owner of the digital content. As another option, a unique identifier of the digital content included in the record may be utilized to identify the owner of the digital content (e.g. via lookup table that maps unique identifiers of digital content to an owners of the digital content, etc.). Of course, however, the owner of the digital content may be identified in any desired manner.

Further, payment for the usage of the digital content is identified, as shown in operation 606. Identifying the payment may include identifying a payment amount associated with usage of the digital content. Thus, an amount to be paid to the owner of the digital content may optionally be identified.

In one embodiment, the payment may be identified based on a contract with the owner of the digital content. For example, each different digital content may be associated with a different payment. As another example, each different owner of digital content may be associated with a different payment. Of course, however, the payment may be identified utilizing any predetermined pricing scheme.

In another embodiment, the payment may be identified utilizing a lookup table. As an option, the lookup table may map the unique identifier of the digital content (e.g. identified via the record) to the payment. As another option, the lookup table may map an identifier of the owner of the digital content to the payment.

Moreover, as shown in operation 608, the payment is distributed to the owner of the digital content. The payment may be distributed to the owner of the digital content in any desired manner. In one embodiment, the payment may be distributed to the owner of the digital content via a billing system. To this end, payment may be made to the owner of the digital content, response to actual usage of digital content indicated by a record received from a source of the usage of the digital content.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, which, when executed by a processor, causes the processor to perform a method, the method comprising:

controlling usage of digital content utilizing digital rights management (DRM), including reducing a quality of a playback of the digital content at a playback device utilized for presenting the digital content upon determining that the playback device has not connected to a digital content provider within a predetermined time period;

receiving at a central collection system from a source of the playback of the digital content a record of the playback of the digital content identified by the source in response to a determination that execution of the playback device utilized for presenting the digital content has been completed, the record including:
a unique identifier of the digital content,
a time and date of an initiation of the playback of the digital content, and
a time and date of a completion of the playback of the digital content;

identifying by the central collection system an owner of the digital content by comparing the unique identifier of the digital content to a lookup table that maps the unique identifier to an owner of the digital content;

determining by the central collection system a payment amount associated with the initiation and completion of playback of the digital content;

distributing both the determined payment amount and a report indicating the user, the time and date of the initiation of the playback of the digital content, and the time and date of the completion of the playback of the digital content from the central collection system to the identified owner of the digital content;

wherein the computer program product is operable such that an advertiser sponsors the digital content, such that the provider of the digital content provides advertising for the advertiser via a digital content providing service of the computer program product in exchange for the advertiser providing the payment to the owner for the playback of the digital content.

2. The computer program product of claim 1, wherein at least one of a subscription fee, a fee particular to the digital content and an advertisement sponsored fee is paid for the usage of the digital content.

3. The computer program product of claim 1, wherein the payment is distributed in response to the usage of the digital content.

4. The computer program product of claim 1, wherein the payment is distributed after a predetermined period of time during which the digital content is used.

5. A method comprising:
controlling usage of digital content utilizing digital rights management (DRM), including reducing a quality of a playback of the digital content at a playback device utilized for presenting the digital content upon determining that the playback device has not connected to a digital content provider within a predetermined time period;

receiving at a central collection system from a source of the playback of the digital content a record of the playback of the digital content identified by the source in response to a determination that execution of the playback device utilized for presenting the digital content has been completed, the record including:
- a unique identifier of the digital content,
- a time and date of an initiation of the playback of the digital content, and
- a time and date of a completion of the playback of the digital content;

identifying by the central collection system an owner of the digital content by comparing the unique identifier of the digital content to a lookup table that maps the unique identifier to an owner of the digital content;

determining by the central collection system a payment amount associated with the initiation and completion of playback of the digital content;

distributing both the determined payment amount and a report indicating the user, the time and date of the initiation of the playback of the digital content, and the time and date of the completion of the playback of the digital content from the central collection system to the identified owner of the digital content;

wherein an advertiser sponsors the digital content, such that the provider of the digital content provides advertising for the advertiser via a digital content providing service of a computer program product in exchange for the advertiser providing the payment to the owner for the playback of the digital content.

* * * * *